(12) United States Patent
Abd Elhamid et al.

(10) Patent No.: US 8,735,016 B2
(45) Date of Patent: May 27, 2014

(54) HYDROPHILIC, ELECTRICALLY CONDUCTIVE FLUID DISTRIBUTION PLATE FOR FUEL CELL

(75) Inventors: Mahmoud H. Abd Elhamid, Grosse Pointe Woods, MI (US); Youssef M. Mikhail, Sterling Heights, MI (US); Gayatri Vyas, Rochester Hills, MI (US); Feng Zhong, Windsor (CA); Richard H. Blunk, Macomb Township, MI (US); Daniel J. Lisi, Eastpointe, MI (US); Michael K. Budinski, Pittsford, NY (US); Gerald W. Fly, Geneseo, NY (US); Timothy J. Fuller, Pittsford, NY (US); Brian K. Brady, North Chili, NY (US); Keith E. Newman, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1990 days.

(21) Appl. No.: 11/127,375

(22) Filed: May 12, 2005

(65) Prior Publication Data

US 2006/0257712 A1    Nov. 16, 2006

(51) Int. Cl.
*H01M 8/02*    (2006.01)
(52) U.S. Cl.
CPC .......... *H01M 8/0202* (2013.01); *H01M 8/0228* (2013.01); *H01M 8/0234* (2013.01)
USPC ......................................................... 429/457
(58) Field of Classification Search
CPC   H01M 8/0213; H01M 8/0234; H01M 8/0267
USPC ........................................ 429/34, 41, 38, 457
See application file for complete search history.

(56) References Cited

U.S. PATENT DOCUMENTS 5,372,981 A * 12/1994 Witherspoon ................ 502/155
5,707,433 A    1/1998 Kuge et al.

(Continued)

FOREIGN PATENT DOCUMENTS

| DE | 10 2004 041 04 B3 | 3/2006 |
|---|---|---|
| JP | 2008-130025 | 5/1996 |
| JP | 2003-157868 | 5/2003 |

OTHER PUBLICATIONS

"Mesoporous Carbons with Controlled Porosity as an Electrocatalytic Support for Methanol Oxidation" Reghuveer et al. Journal of the Electrochemcial Society, 152 (8) A1504-A1510 (2005).*

(Continued)

*Primary Examiner* — Patrick Ryan
*Assistant Examiner* — Stephen Yanchuk
(74) *Attorney, Agent, or Firm* — Brooks Kushman P.C.

(57) ABSTRACT

In at least one embodiment, the present invention provides a hydrophilic electrically conductive fluid distribution plate and a method of making, and system for using, the hydrophilic electrically conductive fluid distribution plate. In at least one embodiment, the plate comprises a plate body defining a set of fluid flow channels configured to distribute flow of a fluid across at least one side of the plate, and a composite conductive coating having a water contact angle of less than 40° adhered to the plate body. In at least one embodiment, the composite coating comprises a polymeric conductive layer adhered to the plate body having an exterior surface, and a particulate carbon layer adhered to the exterior surface of the polymeric conductive layer.

26 Claims, 2 Drawing Sheets

(56) References Cited

U.S. PATENT DOCUMENTS

| | | |
|---|---|---|
| RE37,284 E | 7/2001 | Li et al. |
| 6,372,376 B1 | 4/2002 | Fronk et al. |
| 6,607,857 B2 | 8/2003 | Blunk et al. |
| 6,794,078 B1 | 9/2004 | Tashiro et al. |
| 6,811,918 B2 | 11/2004 | Blunk et al. |
| 6,827,747 B2 | 12/2004 | Lisi et al. |
| 7,261,963 B2* | 8/2007 | Elhamid et al. .......... 429/34 |
| 2001/0004501 A1 | 6/2001 | Yi et al. |
| 2002/0034672 A1 | 3/2002 | Saito et al. |
| 2003/0096151 A1 | 5/2003 | Blunk et al. |
| 2003/0228512 A1 | 12/2003 | Vyas et al. |
| 2004/0062974 A1 | 4/2004 | Abd Elhamid et al. |
| 2004/0081881 A1 | 4/2004 | Vyas et al. |
| 2004/0091768 A1 | 5/2004 | Abd Elhamid et al. |
| 2004/0157108 A1 | 8/2004 | Blunk et al. |
| 2004/0253505 A1 | 12/2004 | Blunk et al. |
| 2005/0031933 A1 | 2/2005 | Blunk et al. |
| 2005/0037935 A1 | 2/2005 | Elhamid et al. |

OTHER PUBLICATIONS

STIC Search.*
International Search Report dated Jul. 23, 2007 for Appln No. PCT/US06/11737 filed Mar. 31, 2006 corresponding to this application.
Office Action dated Jul. 20, 2010 from corresponding German Appn. No. 11 2006 001 181.2, 4 pages.
Translation of Japanese Office Action of Aug. 5, 2011 in corresponding JP Appn. No. 2008-511116, filed Mar. 31. 2006, 3 pgs.

* cited by examiner

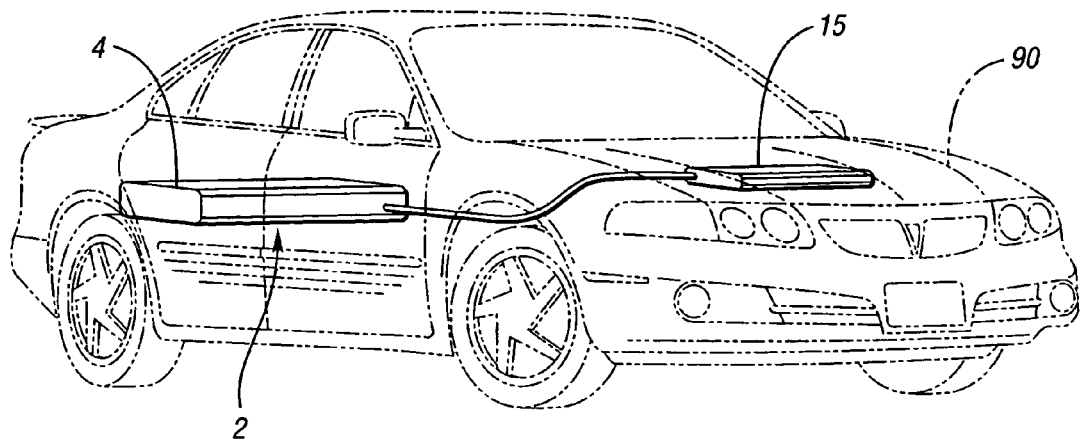
FIG. 1
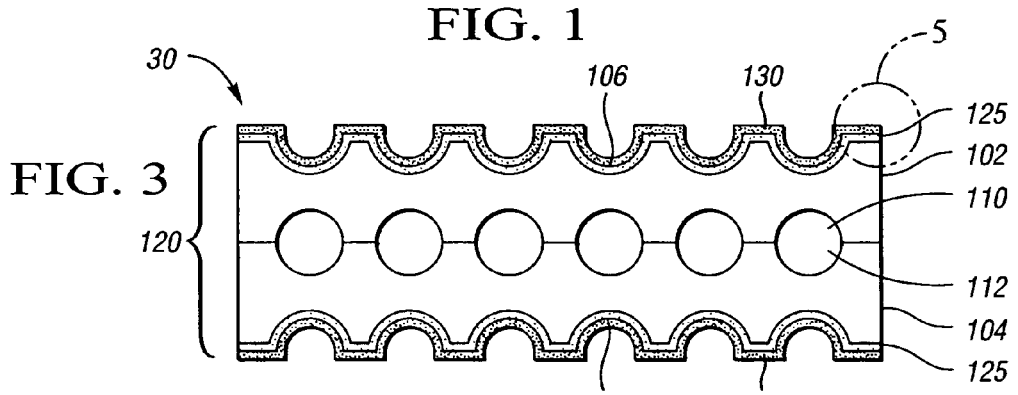
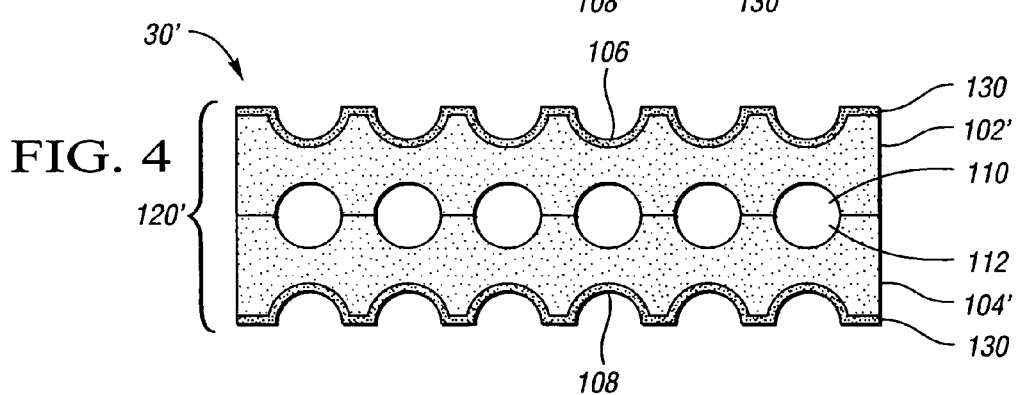
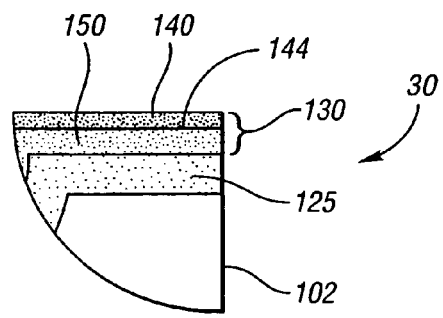

HYDROPHILIC, ELECTRICALLY CONDUCTIVE FLUID DISTRIBUTION PLATE FOR FUEL CELL

FIELD OF THE INVENTION

The present invention relates generally to a hydrophilic electrically conductive fluid distribution plate, a method of making a hydrophilic electrically conductive fluid distribution plate, and systems using a hydrophilic electrically conductive fluid distribution plate according to the present invention. More specifically, the present invention is related to the use of a hydrophilic electrically conductive fluid distribution plate in addressing water transport difficulties in fuel cells and other types of devices.

BACKGROUND ART

Fuel cells are being developed as a power source for many applications including vehicular applications. One such fuel cell is the proton exchange membrane or PEM fuel cell. PEM fuel cells are well known in the art and include in each cell thereof a membrane electrode assembly or MEA. The MEA is a thin, proton-conductive, polymeric, membrane-electrolyte having an anode electrode face formed on one side thereof and a cathode electrode face formed on the opposite side thereof. One example of a membrane-electrolyte is the type made from ion exchange resins. An exemplary ion exchange resin comprises a perfluoronated sulfonic acid polymer such as NAFION™ available from the E.I. DuPont de Nemeours & Co. The anode and cathode faces, on the other hand, typically comprise finely divided carbon particles, very finely divided catalytic particles supported on the internal and external surfaces of the carbon particles, and proton conductive particles such as NAFION™ intermingled with the catalytic and carbon particles; or catalytic particles, without carbon, dispersed throughout a polytetrafluorethylene (PTFE) binder.

Multi-cell PEM fuel cells comprise a plurality of the MEAs stacked together in electrical series and separated one from the next by a gas-impermeable, electrically-conductive fluid distribution plate known as a separator plate or a bipolar plate. Such multi-cell fuel cells are known as fuel cell stacks. The bipolar plate has two working faces, one confronting the anode of one cell and the other confronting the cathode on the next adjacent cell in the stack, and electrically conducts current between the adjacent cells. Electrically conductive fluid distribution plates at the ends of the stack contact only the end cells and are known as end plates. The bipolar plates contain a flow field that distributes the gaseous reactants (e.g. $H_2$ and $O_2$/air) over the surfaces of the anode and the cathode. These flow fields generally include a plurality of lands which define therebetween a plurality of flow channels through which the gaseous reactants flow between a supply header and an exhaust header located at opposite ends of the flow channels.

A highly porous (i.e. ca. 60% to 80%), electrically-conductive material (e.g. cloth, screen, paper, foam, etc.) known as "diffusion media" is generally interposed between electrically conductive fluid distribution plates and the MEA and serves (1) to distribute gaseous reactant over the entire face of the electrode, between and under the lands of the electrically conductive fluid distribution plate, and (2) collects current from the face of the electrode confronting a groove, and conveys it to the adjacent lands that define that groove. One known such diffusion media comprises a graphite paper having a porosity of about 70% by volume, an uncompressed thickness of about 0.17 mm, and is commercially available from the Toray Company under the name Toray 060. Such diffusion media can also comprise fine mesh, noble metal screen and the like as is known in the art.

In an $H_2$—$O_2$/air PEM fuel cell environment, the electrically conductive fluid distribution plates can typically be in constant contact with mildly acidic solutions (pH 3 to 5) containing $F^-$, $SO_4^{--}$, $SO_3^-$, $HSO_4^-$, $CO_3^{--}$, and $HCO_3^-$, etc. Moreover, the cathode typically operates in a highly oxidizing environment, being polarized to a maximum of about +1 V (vs. the normal hydrogen electrode) while being exposed to pressurized air. Finally, the anode is typically constantly exposed to hydrogen. Hence, the electrically conductive fluid distribution plates should be resistant to a hostile environment in the fuel cell.

One of the more common types of suitable electrically conductive fluid distribution plates include those molded from polymer composite materials which typically comprise 50% to 90% by volume electrically-conductive filler (e.g. graphite particles or filaments) dispersed throughout a polymeric matrix (thermoplastic or thermoset). Recent efforts in the development of composite electrically conductive fluid plates have been directed to materials having adequate electrical and thermal conductivity. Material suppliers have developed high carbon loading composite plates comprising graphite powder in the range of 50% to 90% by volume in a polymer matrix to achieve the requisite conductivity targets. Plates of this type will typically be able to withstand the corrosive fuel cell environment and, for the most part, meet cost and conductivity targets. One such currently available bipolar plate is available as the BMC plate from Bulk Molding Compound, Inc. of West Chicago, Ill.

Alternatively, discrete conductive fibers have been used in composite plates in an attempt to reduce the carbon loading and to increase plate toughness. See copending U.S. Pat. No. 6,607,857 to Blunk, et. al., issued Aug. 19, 2003 which is assigned to the assignee of this invention, and is incorporated herein by reference. Fibrous materials are typically ten to one thousand times more conductive in the axial direction as compared to conductive powders. See U.S. Pat. No. 6,827,747 to Lisi, et. al., issued Dec. 7, 2004 which is assigned to the assignee of the present invention and is incorporated herein by reference.

Another one of the more common types of suitable electrically conductive fluid distribution plates include those made of metal coated with polymer composite materials containing about 30% to about 40% by volume conductive particles. In this regard, see U.S. Pat. No. 6,372,376 to Fronk et al., issued Apr. 16, 2002, which (1) is assigned to the assignee of this invention, (2) is incorporated herein by reference, and (3) discloses electrically conductive fluid distribution plates made from metal sheets coated with a corrosion-resistant, electrically-conductive layer comprising a plurality of electrically conductive, corrosion-proof (i.e. oxidation-resistant and-acid resistant) filler particles dispersed throughout a matrix of an acid-resistant, water insoluble, oxidation-resistant polymer that binds the particles together and to the surface of the metal sheet. Fronk et al-type composite coatings will preferably have a resistivity no greater than about 50 ohm-cm$^2$ and a thickness between about 5 microns and 75 microns depending on the composition, resistivity and integrity of the coating. The thinner coatings are preferred to achieve lower IR drop through the fuel cell stack.

As discussed above, a great percentage of the electrically conductive fluid distribution plates comprise either a conductive polymeric composite material or a metallic base layer coated with a conductive polymer composite material. While these types of plates currently typically have a water contact angle of 80° to 90°, resulting in acceptable water management properties, there is a desire to provide an electrically conductive fluid distribution plate having increased water management properties.

SUMMARY OF THE INVENTION

In at least one embodiment, an electrically conductive fluid distribution plate is provided comprising a plate body defining a set of fluid flow channels configured to distribute flow of a fluid across at least one side of the plate, and a composite conductive coating having a water contact angle of less than 40° adhered to the plate body. In at least this embodiment, the composite coating comprises a polymeric conductive layer adhered to the plate body having an exterior surface, and a particulate carbon layer adhered to the exterior surface of the polymeric conductive layer.

In yet another embodiment, a method of manufacturing a fluid distribution plate is provided comprising providing a plate body having a body defining a set of fluid flow channels configured to distribute flow of a fluid across at least one side of the plate, and a composite conductive coating having a water contact angle of less than 40° adhered to the plate body. In at least this embodiment, the composite coating comprises a polymeric conductive layer adhered to the plate body, the polymeric conductive layer having an exterior surface, and a particulate carbon layer adhered to the exterior surface of the polymeric conductive layer.

In still yet another embodiment, a fuel cell is provided. The fuel cell comprises a first electrically conductive fluid distribution plate comprising a plate body defining a set of fluid flow channels configured to distribute flow of a fluid across at least one side of the plate, a composite conductive coating having a water contact angle of less than 40° adhered to the plate body. In at least this embodiment, the composite coating comprises a polymeric conductive layer adhered to the plate body having an exterior surface, and a particulate carbon layer adhered to the exterior surface of the polymeric conductive layer. In at least this embodiment, the fuel cell further comprises a second electrically conductive fluid distributing plate, and a membrane electrode assembly separating the first electrically conductive fluid distribution plate and the second electrically conductive fluid distribution plate, the membrane electrode assembly comprising an electrolyte membrane, having a first side and a second side, an anode adjacent to the first side of the electrolyte membrane, and a cathode adjacent to the second side of the electrolyte membrane.

The present invention will be more fully understood from the following description of preferred embodiments of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which:

FIG. 1 is a schematic illustration of a vehicle including a fuel cell system;

FIG. 3 is an illustration of an electrically conductive fluid distribution plate according to one embodiment of the present invention;

FIG. 4 is an illustration of an electrically conductive fluid distribution plate according to another embodiment of the present invention; and FIG. 5 is an enlarged view of a portion of the plate illustrated in FIG. 3.

Figure 2:
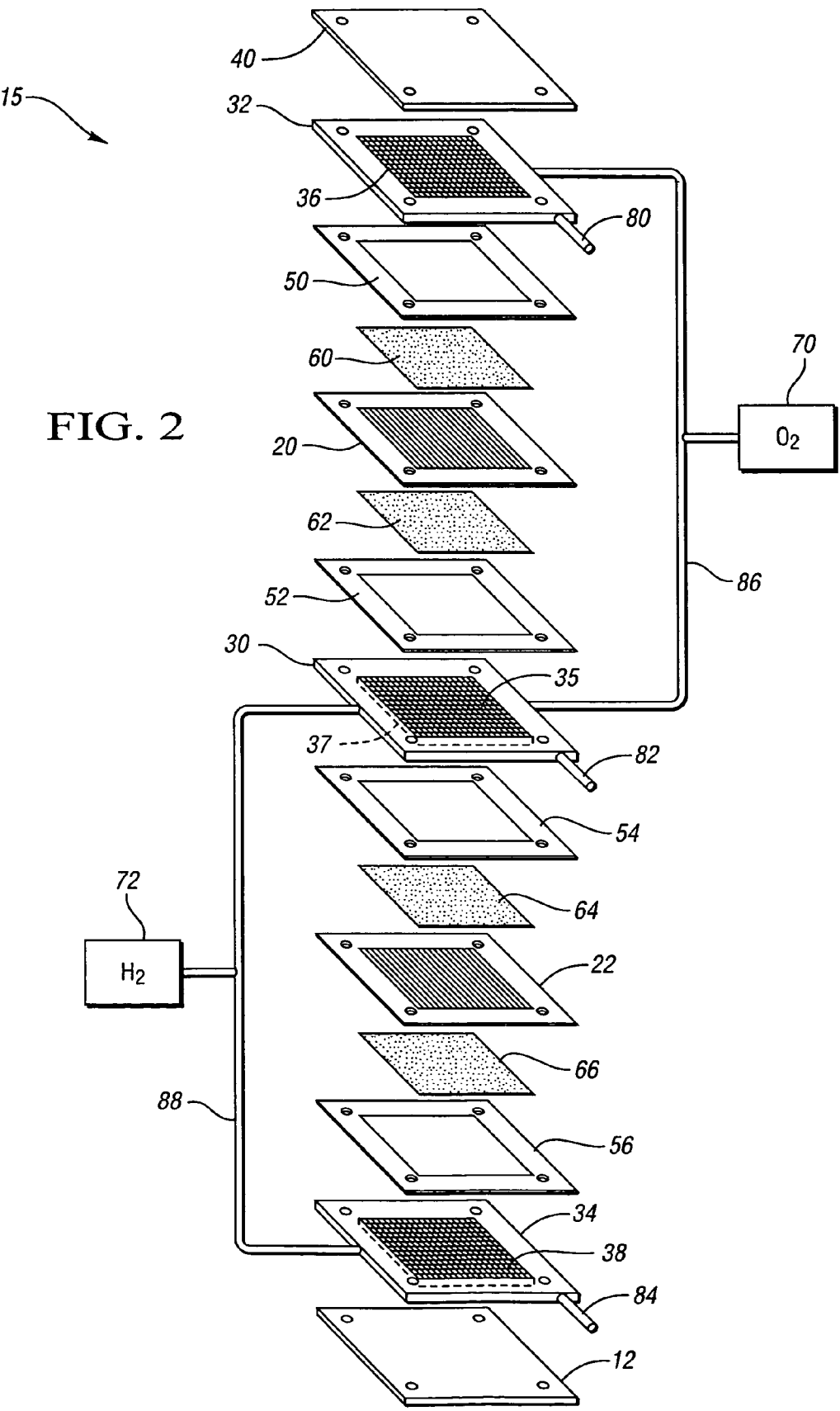
FIG. 2 is a schematic illustration of a fuel cell stack employing two fuel cells.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

The following description of the preferred embodiments is merely exemplary in nature and is in no way intended to limit the invention, its application, or uses. Reference will now be made in detail to presently preferred compositions, embodiments and methods of the present invention, which constitute the best modes of practicing the invention presently known to the inventors. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative bases for the claims and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and to normal grammatical variations of the initially defined abbreviation; and, unless expressly stated to the contrary, measurement of a property is determined by the same technique as previously or later referenced for the same property.

Referring to FIG. 1, an exemplary fuel cell system 2 for automotive applications is shown. It is to be appreciated, however, that other fuel cell system applications, such as for example, in the area of residential systems, may benefit from the present invention.

In the embodiment illustrated in FIG. 1, a vehicle is shown having a vehicle body 90, and an exemplary fuel cell system 2 having a fuel cell processor 4 and a fuel cell stack 15. A discussion of embodiments of the present invention as embodied in a fuel cell stack and a fuel cell, is provided hereafter in reference to FIGS. 2-6. It is to be appreciated that while one particular fuel cell stack 15 design is described, the present invention may be applicable to any fuel cell stack designs where fluid distribution plates have utility.

FIG. 2 depicts a two fuel cell, fuel cell stack 15 having a pair of membrane-electrode-assemblies (MEAs) 20 and 22 separated from each other by an electrically conductive fluid distribution plate 30. Plate 30 serves as a bi-polar plate having a plurality of fluid flow channels 35, 37 for distributing fuel and oxidant gases to the MEAs 20 and 22. By "fluid flow channel" we mean a path, region, area, or any domain on the plate that is used to transport fluid in, out, along, or through at least a portion of the plate. The MEAs 20 and 22, and plate 30, may be stacked together between clamping plates 40 and 42, and electrically conductive fluid distribution plates 32 and 34. In the illustrated embodiment, plates 32 and 34 serve as end plates having only one side containing channels 36 and 38, respectively, for distributing fuel and oxidant gases to the MEAs 20 and 22, as opposed to both sides of the plate.

Nonconductive gaskets 50, 52, 54, and 56 may be provided to provide seals and electrical insulation between the several components of the fuel cell stack. Gas permeable carbon/graphite diffusion papers 60, 62, 64, and 66 can press up against the electrode faces of the MEAs 20 and 22. Plates 32 and 34 can press up against the carbon/graphite papers 60 and 66 respectively, while the plate 30 can press up against the carbon/graphite paper 64 on the anode face of MEA 20, and against carbon/graphite paper 60 on the cathode face of MEA 22.

In the illustrated embodiment, an oxidizing fluid, such as $O_2$, is supplied to the cathode side of the fuel cell stack from storage tank 70 via appropriate supply plumbing 86. While the oxidizing fluid is being supplied to the cathode side, a reducing fluid, such as $H_2$, is supplied to the anode side of the fuel cell from storage tank 72, via appropriate supply plumbing 88. Exhaust plumbing (not shown) for both the $H_2$ and $O_2$/air sides of the MEAs will also be provided. Additional plumbing 80, 82, and 84 is provided for supplying liquid coolant to the plate 30 and plates 32 and 34. Appropriate plumbing for exhausting coolant from the plates 30, 32, and 34 is also provided, but not shown.

FIG. 3 illustrates an exemplary electrically conductive fluid distribution plate 30 comprising a first sheet 102 and a second sheet 104. First and second sheets 102, 104 comprise a plurality of fluid flow channels 106, 108 on their exterior sides/surfaces through which the fuel cell's reactant gases flow typically in a tortuous path along one side of each plate. The interior sides of the first and second sheets 102, 104 may include a second plurality fluid flow channels 110, 112 through which coolant passes during the operation of the fuel cell. When the interior sides of first sheet 102 and second sheet 104 are placed together to form a plate body 120, the fluid flow channels connect and form a series of channels for coolant to pass through the plate 30.

The plate body 120 may be formed from a single sheet, or plate, rather than the two separate sheets illustrated in FIG. 3. When the plate body 120 is formed from a single plate, the channels may be formed on the exterior sides of the plate body 120 and through the middle of the plate body 120 such that the resulting plate body 120 is equivalent to the plate body 120 configured from two separate sheets 102, 104.

The plate body 120 may be formed from a metal, a metal alloy, or a composite material, and has to be conductive. In one embodiment, a passivating metal or a passivating alloy forms the plate body 120. By "passivating metal" or "passivating alloy" we mean a metal or an alloy that forms an inactive passivating layer as a result of reaction with ambient substances such as air or water. For example, the passivating layer (not shown) may be a metal oxide. Metal oxides typically act as barriers to further oxidation by requiring oxygen to diffuse through the layer to reach the metal or alloy surface. Thus, the passivating layer can protect the integrity of the metal or metal alloy.

Suitable metals, metal alloys, and composite materials should be characterized by sufficient durability and rigidity to function as a fluid distribution plate in a fuel cell. Additional design properties for consideration in selecting a material for the plate body include gas permeability, conductivity, density, thermal conductivity, corrosion resistance, pattern definition, thermal and pattern stability, machinability, cost and availability Available metals and alloys include aluminum, titanium, stainless steel, nickel based alloys, and combinations thereof. Composite materials may comprise graphite, graphite foil, graphite particles in a polymer matrix, carbon fiber paper and polymer laminates, polymer plates with metal cores, conductively coated polymer plates, and combinations thereof.

First and second sheets 102, 104 are typically between about 51 to about 510 microns microns (μm) thick. The sheets 102, 104 may be formed by machining, molding, cutting, carving, stamping, photo etching such as through a photolithographic mask, or any other suitable design and manufacturing process. It is contemplated that the sheets 102, 104 may comprise a laminate structure including a flat sheet and an additional sheet including a series of exterior fluid flow channels. An interior metal spacer sheet (not shown) may be positioned between the first and second sheets 102, 104.

In the schematically illustrated plate 30 of FIG. 3, the substrate 102, 104 forming the structural component of the body 120 comprises a corrosion-susceptible metal such as aluminum, titanium, stainless steel, and nickel based alloys. The working faces of the plate 30 are covered with a conductive polymeric composite coating 125. In at least one embodiment, the polymeric conductive coating 125 comprises an electrically-conductive, oxidation resistant, and acid-resistant protective material having a resistivity less than about 50 ohm-cm$^2$, and comprises a plurality of oxidation-resistant, acid-insoluble, conductive particles (i.e. less than about 50 microns) dispersed throughout an acid-resistant, oxidation-resistant polymer matrix. Any suitable conductive polymeric coating 125 may be employed. Suitable examples of such coatings and their manner of application can be found in U.S. Pat. No. 6,372,376.

In at least one embodiment, the conductive filler particles can be at least one of gold, platinum, graphite, carbon, palladium, niobium, rhodium, ruthenium, and the rare earth metals. In at least certain embodiments, the particles may comprise conductive carbon and graphite at a loading of 25% by weight. The polymer matrix may comprise any water-insoluble polymer that can be formed into a thin adherent film and that can withstand the hostile oxidative and acidic environment of the fuel cell. Hence, such polymers, as epoxies, polyamide-imides, polyether-imides, polyphenols, fluroelastomers (e.g., polyvinylidene flouride), polyesters, phenoxy-phenolics, epoxide-phenolics, acrylics, and urethanes, inter alia are seen to be useful with the composite coating. Cross-linked polymers may be employed for producing impermeable coatings, with polyamide-imide thermosetting polymers being most preferred.

In at least one embodiment, the polymer composite layer 125 may be applied by dissolving polyamide-imide in a solvent comprising a mixture of N-methylpyrrolidone, propylene glycol and methyl ether acetate, and 21% to 23% by weight of a mixture of graphite and carbon black particles added thereto. In at least one embodiment, the graphite particles may range in size from 5 microns to 20 microns and the carbon black particles may range in size from 0.5 micron to 1.5 microns. In at least one embodiment, the mix may be sprayed on to the substrate, dried (i.e. solvent vaporized), and cured to provide 10 to 30 micron thick coating having a carbon-graphite content of 38% by weight. It may be cured slowly at low temperatures (i.e. <400° F.), or more quickly in a two step process wherein the solvent is first removed by heating for ten minutes at about 300° F. to 350° F. (i.e., dried) followed by higher temperature heating (500° F. to 750° F.) for various times ranging from about ½ min to about 15 min (depending on the temperature used) to cure the polymer. As described hereinafter, the porous surface layer 130 of the invention is applied before drying and curing while the composite layer 125 is still tacky.

The conductive polymer coating 125 may be applied directly to the substrate metal and allowed to dry/cure thereon, or the substrate metal (e.g., Al) may first be covered with an oxidizable metal (e.g., stainless steel) before the electrically conductive polymer composite layer 125 is applied (see Li et al. supra). The composite layer 125 may be applied in a variety of ways, e.g., brushing, spraying, spreading, or laminating a preformed film onto the substrate.

In the embodiment illustrated in FIG. 3, the electrically conductive fluid distribution plate 30 includes a composite conductive coating 130 adhered to and covering the polymeric conductive coating 125. In at least one embodiment, as best illustrated in FIG. 5, the composite conductive coating comprises a polymeric conductive layer 140 adjacent the polymeric conductive coating 125 and a particulate carbon layer 150 on the upper surface 144 of the polymeric conductive layer 140. In at least one embodiment, the composite conductive coating 130 has a water contact angle of less than 40°, in another embodiment of less than 25°, in yet another embodiment of less than 10°, in still yet another embodiment of less than 5°, and in still yet another embodiment of less than 1°.

While the composite conductive coating 130 can extend over substantially the entire outer surface of plate 30, as schematically illustrated in FIG. 3, the composite conductive coating 130 can also extend over less than the entire outer surface. Furthermore, while the particulate carbon layer 150 can extend over substantially the entire polymeric conductive layer 140, as schematically illustrated in FIG. 3, the particulate carbon layer 150 can also extend over less than the entire polymeric conductive layer 140. While, due to the relatively brittle nature of the composite conductive layer 130 as a result of the particulate carbon layer 140, the polymeric conductive coating 125 is provided, at least in part, to provide additional corrosion protection to the metal substrates 102 and 104, in at least one embodiment, it is contemplated however that the polymeric conductive coating 125 could be omitted with the polymeric conductive layer 140 providing sufficient corrosion protection to the metal substrates 102, 104.

Applicants have found that providing an electrically conductive distribution plate 30 having the composite conductive coating 130 with the particulate carbon layer can result in an electrically conducted distribution plate having excellent water management properties (i.e., having a contact angle less than 40°).

In at least one embodiment the polymeric conductive layer 140 of the composite coating 130 can be substantially similar to the polymeric conductive coating 125 described above except that the upper surface 144 of the polymeric conductive layer 140 is impregnated with carbon particles. However, it should be understood that any suitable polymeric conductive material can be used to form the polymeric conductive layer 140. In at least one embodiment, the polymeric conductive layer 140 has a thickness of 10 to 40 microns, and in another embodiment of 15 to 30 microns.

In at least one embodiment, the particulate carbon layer 150 comprises a plurality of carbon particles disposed on the upper surface 144 of the conductive layer 140. In at least one embodiment, the particulate carbon layer 150 has a thickness of 0.5 to 10 microns, and in another embodiment of 1 to 5 microns. In at least one embodiment, the carbon particles of the particulate carbon layer 150 may exhibit a loading of 5 to 70% by weight, based on the weight of the composite coating 130, in other embodiments of 15 to 60%, and in yet other embodiments of 30 to 50%. In at least one embodiment, the particulate carbon comprises carbon black, graphite, and mixtures thereof.

Various types of carbon black are suitable for use in the layer 150. By way of illustration and not by limitation, the carbon black may be selected from acetylene black, Ravan black, Ketjen black.TM., Vulcan black.TM., Regal.TM., furnace black, black pearl.™., AX-21 and combinations thereof. Carbon black may be characterized by a particle size between about 0.05 and about 0.2 µm.

Applicants have discovered that certain types of carbon black have pore structures that make them particularly suitable for use with the present invention. In at least one embodiment, carbon black particles used to form the particulate carbon layer 150 of the electrically conductive fluid distribution plate 30 made in accordance with the present invention may exhibit a mesopore to micropore ratio of 5:1 to 40:1, in other embodiments of 10:1 to 35:1, and in yet other embodiments of 15:1 to 25:1. As used herein, the term "mesopore" refers to a pore size of 1 to 80 nm (nanometers) and the term "micropore" refers to a pore size of less than 1 nm. In at least one embodiment, acetylene black, which has a mesopore to micropore ratio of 20:1, has proven to be very effective in providing the hydrophilic composite coating 130.

Applicants have found that certain types of carbon black have polar properties that make them particularly suitable for use with the present invention. In at least one embodiment, carbon black particles used to form the particulate carbon layer 150 of the electrically conductive fluid distribution plate 30 made in accordance with the present invention may be acidic and exhibit a pH of less than 4.0, in other embodiments between 1 to 3.5, and in yet other embodiments between 1.5 to 3.0. In this embodiment, Ravan black, having a pH of 2.3, has proven to be very effective in providing the hydrophilic composite coating 130.

In at least one embodiment, polar graphite particles can be used to form the particulate carbon layer 150 of the electrically conductive fluid distribution plate 30 made in accordance with the present invention. In this embodiment, acidic sulfonated graphite, having a pH of less than 4.0 has proven to be very effective in providing the hydrophilic composite coating 130.

The manner in which the composite conductive coating 130 is formed is not necessarily important. The composite conductive coating 130 can be provided on the plate 30 in any suitable manner. One exemplary manner is to provide a wet layer 140 of polymeric conductive material of the same or similar composition as used to form conductive polymeric composite coating 125 over conductive polymeric composite coating 125. The wet polymeric conductive layer 130 can be provided in any suitable manner such as by spraying. Prior to the wet polymeric conductive layer 140 fully drying, a suitable amount of particulate carbon can be embedded within the upper surface 144 of the wet polymeric conductive layer 140 to form particulate carbon layer 150. The particulate carbon can be embedded in any suitable manner, such as spraying, Doctor Blade coating, and screen printing.

The wet polymeric layer 140 can then be dried or cured with the particulate carbon layer 150 thereon. If excess carbon particles remain on the surface of the cured polymeric layer 140 after curing, the surface layer can be wiped or cleaned of the excess carbon particles in any suitable manner.

FIG. 4 illustrates another embodiment of the present invention. The plate 30' and the body 120' illustrated in FIG. 4 are similar in construction and use to the plate 30 and the body 120 illustrated in FIG. 3. Parts of the plate 30' that are substantially the same as the corresponding parts in the plate 30 illustrated in FIG. 3 are given the same reference numeral and parts of the plate 30' that are substantially different than the corresponding parts in the plate 30 are given the same part number with the suffix "'" (prime) added for clarity.

The body 120' of the electrically conductive fluid distribution plate 30' is made (e.g. molded) entirely of composite material, and the composite conductive coating 130 is formed on the exterior surface of the composite that engages the diffusion media. In this embodiment, conductive coating 125 is not necessary. The composite material of the plate 30' can be any suitable conductive composite material for forming plates, such as a polymer composite material comprising 50% to 90% by volume electrically-conductive filler (e.g. graphite particles or filaments) dispersed throughout a polymeric matrix (thermoplastic or thermoset).

An electrically conductive fluid distribution plate according to the various embodiments of the present invention has excellent water management properties. It should be understood that the principles of the present invention apply equally as well to unipolar plates and bipolar plates.

The present invention will be further explained by way of example. It is to be appreciated that the present invention is not limited by the example.

EXAMPLE

A metal bipolar plate is first coated with a conductive protective polymeric coating such as those disclosed in U.S. Pat. No. 6,372,376. This first coating helps to protect the underlying metal (e.g. stainless steel) from corroding in the aggressive fuel cell environment and is flashed for 10 minutes at 150° C. and then cured at 260° C. for 15 minutes. After the plate cools down, a second layer of the same polymeric coating is then sprayed onto the first coating. This wet layer is then dusted with carbon black (acetylene black) using a spray gun and is then cured using the same curing cycle as the first coating. After curing, dry extra carbon black (acetylene black) dust is wiped off the plate. The water contact angle on this plate is measured to be less than 10°.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An electrically conductive fluid distribution plate comprising:
a plate body defining a set of fluid flow channels configured to distribute flow of a fluid across at least one side of the plate; and
a composite conductive coating having a water contact angle of less than 40° adhered to the plate body, the composite coating, comprising:
a polymeric conductive layer adhered to the plate body, the polymeric conductive layer having an exterior surface; and
a particulate carbon layer adhered to the exterior surface of the polymeric conductive layer wherein the particulate carbon layer is a carbon black layer comprising a plurality of carbon black particles dispersed on the exterior surface of the polymeric conductive layer, the carbon black particles having a particle size between 0.05 μm and 0.2 μm and a mesopore to micropore ratio of 5:1 to 40:1, the carbon black layer comprising at least one of acetylene black, furnace black, and combinations thereof.

2. The plate of claim 1 wherein the carbon black layer has a thickness of 0.5 to 10 microns and the polymeric conductive layer has a thickness of 10 to 40 microns.

3. The plate of claim 2 wherein the composite coating comprises 5 to 70% by weight of carbon black, based upon the weight of the composite conductive coating.

4. The plate of claim 1 wherein the plate body comprises a metallic sheet and a composite polymeric conductive coating, different from the composite conductive coating.

5. The plate of claim 1 wherein the plate body comprises a metallic sheet.

6. The plate of claim 1 wherein the plate body comprises a composite material comprising electrically conductive filler disposed throughout a polymeric matrix.

7. The plate of claim 1 wherein the carbon black layer is acidic.

8. The plate of claim 1 wherein carbon black layer has a pH of less than 4.

9. The plate of claim 8 wherein the carbon black layer comprises Ravan black.

10. The plate of claim 1 wherein the carbon black layer comprises acetylene black.

11. The plate of claim 1 wherein the particulate carbon comprises acidic graphite.

12. The plate of claim 1 wherein the water contact angle is less than 10°.

13. A fuel cell comprising:
a first electrically conductive fluid distribution plate comprising a plate body defining a set of fluid flow channels configured to distribute flow of a fluid across at least one side of the plate,
a composite conductive coating having a water contact angle of less than 40° adhered to the plate body, the composite coating comprising:
a polymeric conductive layer adhered to the plate body, the polymeric conductive layer having an exterior surface; and
a particulate carbon layer adhered to the exterior surface of the polymeric conductive layer wherein the particulate carbon layer is a carbon black layer comprising a plurality of carbon black particles dispersed on the exterior surface of the polymeric conductive layer, the carbon black particles having a particle size between 0.05 82 m and 0.2 μm and a mesopore to micropore ratio of 5:1 to 40:1;
a second electrically conductive fluid distribution plate; and
a membrane electrode assembly separating the first electrically conductive fluid distribution plate and the second electrically conductive fluid distribution plate, the membrane electrode assembly comprising:
an electrolyte membrane, having a first side and a second side, an anode adjacent to the first side of the electrolyte membrane; and a cathode adjacent to the second side of the electrolyte membrane.

14. An electrically conductive fluid distribution plate comprising:

a plate body defining a set of fluid flow channels configured to distribute flow of a fluid across at least one side of the plate; and a composite conductive coating having a water contact angle of less than 40° adhered to the plate body, the composite coating, comprising:

a polymeric conductive layer adhered to the plate body, the polymeric conductive layer having an exterior surface; and a particulate carbon layer adhered to the exterior surface of the polymeric conductive layer wherein the particulate carbon layer is a carbon black layer comprising a plurality of carbon black particles dispersed on the exterior surface of the polymeric conductive layer, a mesopore to micropore ratio of 5:1 to 40:1.

15. The plate of claim 14 wherein the carbon black layer has a thickness of 0.5 to 10 microns and the polymeric conductive layer has a thickness of 10 to 40 microns.

16. The plate of claim 15 wherein the composite coating comprises 5 to 70% by weight of carbon black, based upon the weight of the composite conductive coating.

17. The plate of claim 14 wherein the plate body comprises a metallic sheet and a composite polymeric conductive coating, different from the composite conductive coating.

18. The plate of claim 14 wherein the plate body comprises a metallic sheet.

19. The plate of claim 14 wherein the plate body comprises a composite material comprising electrically conductive filler disposed throughout a polymeric matrix.

20. The plate of claim 14 wherein the carbon black layer comprises a component selected from the group consisting of acetylene black, furnace black, and combinations thereof.

21. The plate of claim 20 wherein the carbon black particles have a particle size between 0.05 μm and 0.2 μm.

22. The plate of claim 21 wherein the carbon black layer is acidic.

23. The plate of claim 14 wherein the particulate carbon comprises acidic graphite.

24. The plate of claim 14 wherein the water contact angle is less than 10°.

25. The plate of claim 1 wherein the carbon black layer comprises a component selected from the group consisting of acetylene black, Ravan black, Vulcan black™, furnace black, ketjen black™, black pearl™, regal™, AX-21 and combinations thereof.

26. The fuel cell of claim 13 wherein the carbon black layer comprises furnace black.

* * * * *